(12) United States Patent
Yamaki

(10) Patent No.: US 10,994,303 B2
(45) Date of Patent: May 4, 2021

(54) METHODS FOR PRODUCING TRANSPARENT CONDUCTIVE FILM AND TRANSPARENT CONDUCTIVE PATTERN

(71) Applicant: SHOWA DENKO K.K., Tokyo (JP)

(72) Inventor: Shigeru Yamaki, Tokyo (JP)

(73) Assignee: SHOWA DENKO K.K., Tokyo (JP)

(*) Notice: Subject to any disclaimer, the term of this patent is extended or adjusted under 35 U.S.C. 154(b) by 0 days.

(21) Appl. No.: 16/477,614

(22) PCT Filed: Jan. 15, 2018

(86) PCT No.: PCT/JP2018/000780
§ 371 (c)(1),
(2) Date: Jul. 12, 2019

(87) PCT Pub. No.: WO2018/131702
PCT Pub. Date: Jul. 19, 2018

(65) Prior Publication Data
US 2019/0366380 A1 Dec. 5, 2019

(30) Foreign Application Priority Data
Jan. 16, 2017 (JP) .............................. JP2017-004852

(51) Int. Cl.
*B05D 5/00* (2006.01)
*B05D 5/12* (2006.01)
(Continued)

(52) U.S. Cl.
CPC ................. *B05D 5/12* (2013.01); *B05D 7/04* (2013.01); *C09D 11/037* (2013.01); *C09D 11/52* (2013.01); *H01B 13/00* (2013.01)

(58) Field of Classification Search
CPC .......... B05D 5/12; B05D 7/04; C09D 11/037; C09D 11/52; H01B 13/00
(Continued)

(56) References Cited

U.S. PATENT DOCUMENTS 8,865,027 B2 10/2014 Alden et al.
9,236,162 B2 * 1/2016 Suganunna .......... H01B 13/003
(Continued)

FOREIGN PATENT DOCUMENTS

JP  2006-212477 A  8/2006
JP  2008-510597 A  4/2008
(Continued)

OTHER PUBLICATIONS

C. Ducamp-Sanguesa et al., "Synthesis and Characterization of Fine and Monodisperse Silver Particles of Uniform Shape," Journal of Solid State Chemistry, 1992, pp. 272-280, vol. 100.
(Continued)

*Primary Examiner* — Peter Dungba Vo
*Assistant Examiner* — Azm A Parvez
(74) *Attorney, Agent, or Firm* — Sughrue Mion, PLLC

(57) ABSTRACT

Methods for producing a transparent conductive film and transparent conductive pattern having superior in-plane uniformity of resistance, by a printing method of slit coating or roll coating of metal nanowire ink. The methods include applying a metal nanowire ink containing metal nanowires, a binder resin containing more than 50 mol % monomer units derived from N-vinylacetamide, and a solvent, to at least one surface of a transparent resin film and drying to form a transparent conductive layer, the application of the metal nanowire ink to the transparent resin film being application by slit coating or roll coating performed using a transparent resin film and metal nanowire ink with which the advancing angle ($\theta a$) of the dynamic contact angle of the metal nanowire ink relative to the transparent resin film satisfies $10.0° < \theta a \leq 25.0°$, and the difference ($\theta a - \theta r$) between the advancing angle ($\theta a$) and the receding angle ($\theta r$) is $10.0°$ or higher.

8 Claims, 2 Drawing Sheets

(51) Int. Cl.
*B05D 7/04* (2006.01)
*C09D 11/037* (2014.01)
*C09D 11/52* (2014.01)
*H01B 13/00* (2006.01)

(58) Field of Classification Search
USPC .............. 29/850, 846, 832, 829, 825, 592.1
See application file for complete search history.

(56) References Cited

U.S. PATENT DOCUMENTS

| | | |
|---|---|---|
| 2006/0172082 A1 | 8/2006 | Masuda |
| 2007/0286943 A1 | 12/2007 | Clarke |
| 2012/0027837 A1* | 2/2012 | DeMuth ............... C12N 5/0068 424/443 |
| 2014/0287308 A1* | 9/2014 | Okada .................... C08F 26/02 429/217 |
| 2016/0032146 A1* | 2/2016 | Hozumi ................ C23C 18/122 528/39 |
| 2016/0073494 A1* | 3/2016 | Uchida .................. H05K 3/105 345/173 |
| 2017/0015857 A1 | 1/2017 | Kodama et al. |
| 2017/0038047 A1* | 2/2017 | Golle ........................ F21K 9/60 |

FOREIGN PATENT DOCUMENTS

| | | |
|---|---|---|
| JP | 2009-253016 A | 10/2009 |
| JP | 2015-174922 A | 10/2015 |
| TW | 201610006 A | 3/2016 |
| WO | 2016/018792 A1 | 2/2016 |

OTHER PUBLICATIONS

Taiwanese Office Action issued in TW 107101503 dated Mar. 6, 2019.
Decision of Patent Grant dated Dec. 4, 2018, issued by the Japanese Patent Office in counterpart JP 2018-560230.
International Search Report of PCT/JP2018/000780 dated Feb. 13, 2018.

* cited by examiner

METHODS FOR PRODUCING TRANSPARENT CONDUCTIVE FILM AND TRANSPARENT CONDUCTIVE PATTERN

CROSS REFERENCE TO RELATED APPLICATIONS

This application is a National Stage of International Application No. PCT/JP2018/000780 filed Jan. 15, 2018, claiming priority based on Japanese Patent Application No. 2017-004852 filed Jan. 16, 2017.

TECHNICAL FIELD

The present disclosure relates to methods for producing a transparent conductive film and a transparent conductive pattern, and relates to methods for producing a transparent conductive film and a transparent conductive pattern using a metal nanowire ink suitable for a printing method such as a slit coating method or a roll coating method.

BACKGROUND ART

Recently, metal nanowire has drawn attention as a material for a high transparent/high conductive thin film which can be used in place of the ITO (Indium Tin Oxide) film used for a transparent electrode for a touch panel, etc., In general, such metal nanowires are produced by heating a metal compound under the presence of polyvinylpyrrolidone and a polyol such as ethylene glycol, etc. (Non-Patent Document 1).

Patent Document 1 discloses an ink for forming a transparent conductive film, comprising silver nanowires, an aqueous solvent, a cellulose-based binder resin, and a surfactant. Patent Document 2 discloses a silver nanowire ink useful as a material for forming a transparent conductive body. Further, Patent Document 3 discloses a composition for forming a conductive layer, comprising metal nanowires, polyvinyl acetamide, and a water/alcohol solvent.

PRIOR ARTS

Patent Document

Patent Document 1: U.S. Pat. No. 8,865,027
Patent Document 2: Japanese Unexamined Patent Publication (Kokai) No. 2015-174922
Patent Document 3: Japanese Unexamined Patent Publication (Kokai) No. 2009-253016

Non-Patent Document

Non-Patent Document 1: Ducamp-Sanguesa, et al., J. Solid State Chem., 1992, 100, 272

SUMMARY

Not all of the above conventional technologies disclose a metal nanowire ink suitable for a printing method such as a slit coating method or a roll coating method, and a method for producing a transparent conductive film using such ink. Patent Document 3 discloses a composition comprising polyvinyl acetamide, similar to the present disclosure. Specific composition is not disclosed therein. Thus, Patent Document 3 cannot be treated as prior art disclosing a method for producing a transparent conductive film using a metal nanowire ink, by a slit coating method or a roll coating method.

On of the objectives of the present disclosure is to provide methods for producing a transparent conductive film and a transparent conductive pattern having a superior in-plane resistance uniformity, by a printing method such as slit coating or roll coating of a metal nanowire ink.

In order to achieve the above objective, one aspect of the present disclosure is as follows.

[1] A method for producing a transparent conductive film comprising a step of forming a transparent conductive layer by coating a metal nanowire ink on at least one face of a transparent resin film, and drying the coated ink, the metal nanowire ink comprising metal nanowires, a binder resin having more than 50 mol % of monomer units derived from N-vinylacetamide, and a solvent, wherein, the coating of the metal nanowire ink on the transparent resin film is performed by a slit coating method or a roll coating method, using the transparent resin film and the metal nanowire ink with which an advancing angle ($\theta a$) of a dynamic contact angle of the metal nanowire ink relative to the transparent resin film satisfies $10.0° < \theta a \leq 25.0°$, and a difference ($\theta a - \theta r$) between the advancing angle ($\theta a$) and a receding angle ($\theta r$) of the dynamic contact angle is $10.0°$ or more.

[2] A method for producing a transparent conductive film according to [1], wherein the metal nanowires are silver nanowires.

[3] A method for producing a transparent conductive film according to [1] or [2], wherein the content of the metal nanowires in the metal nanowire ink is 0.01 to 1.5 mass %.

[4] A method for producing a transparent conductive film according to any one of [1] to [3], wherein the transparent resin film is a film made of a resin selected from a group consisting of polyester, polycarbonate, an acrylic resin, and a cycloolefin polymer.

[5] A method for producing a transparent conductive film according to any one of [1] to [4], wherein the content of the binder resin in the metal nanowire ink is 0.1 to 2.0 mass %.

[6] A method for producing a transparent conductive film according to any one of [1] to [5], wherein the solvent is a mixture solvent of alcohol and water, the content of the alcohol in the mixture solvent is 85 mass % or more and 95 mass % or less, and the content of saturated monohydric alcohol having 1 to 3 carbon atoms represented by $C_nH_{2n+1}OH$ (n represents an integer of 1 to 3) in the alcohol is 30 mass % or more and 85 mass % or less.

[7] A method for producing a transparent conductive film according to any one of [1] to [6], further comprising a step of forming an overcoat layer which covers the transparent conductive layer.

[8] A method for producing a transparent conductive pattern comprising a step of patterning a transparent conductive layer of the transparent conductive film obtained by the method for producing a transparent conductive film according to any one of [1] to [7].

[9] A method for producing a transparent conductive pattern according to [8], further comprising a step of forming an overcoat layer which covers the transparent conductive pattern.

According to methods for producing a transparent conductive film and a transparent conductive pattern of the present disclosure, a uniform and low-resistance transparent conductive layer can be formed by printing a metal nanowire ink by a slit coating method or a roll coating method.

ASPECT OF DISCLOSURE

Figure 1:
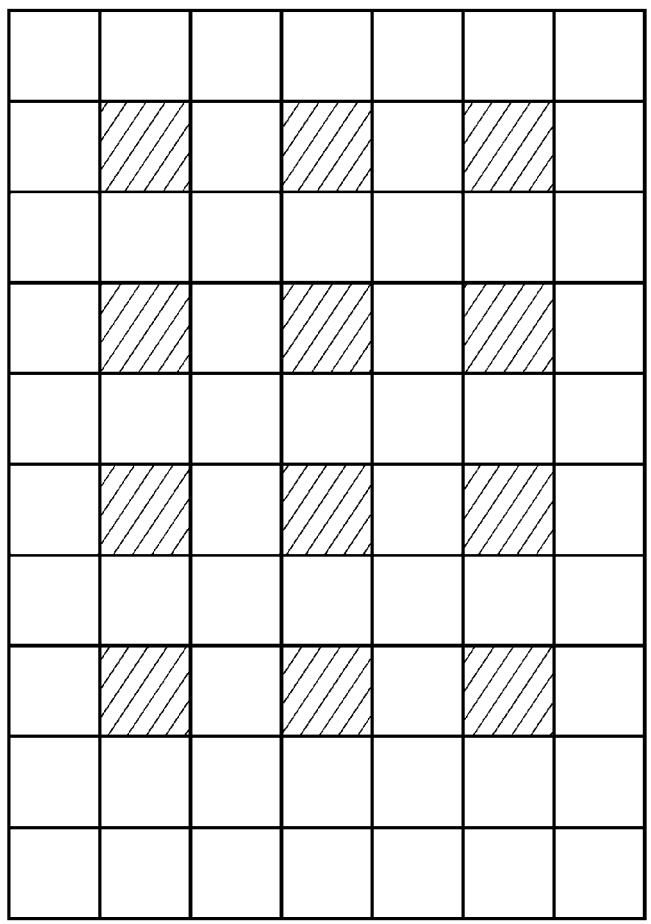
FIG. 1 is a view explaining an in-plane uniformity evaluation method of the sheet resistance in each Example and Comparative Example.
Figure 1:
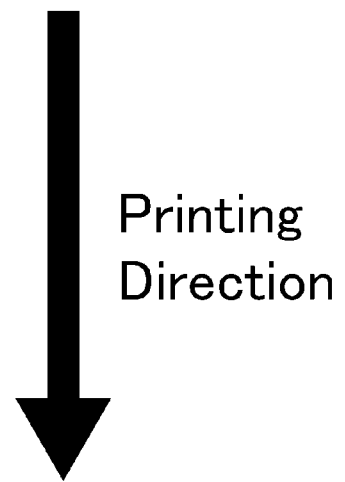

Hereinbelow, an aspect of the present disclosure (hereinbelow, referred to as an aspect) will be explained.

The first aspect of the present disclosure is a method for producing a transparent conductive film comprising a step of forming a transparent conductive layer by coating a metal nanowire ink on at least one face of a transparent resin film, and drying the coated ink, the metal nanowire ink comprising metal nanowires, a binder resin having more than 50 mol % of monomer units derived from N-vinylacetamide, and a solvent wherein, the coating of the metal nanowire ink on the transparent resin film is performed by a slit coating method or a roll coating method, using the transparent resin film and the metal nanowire ink with which an advancing angle ($\theta a$) of a dynamic contact angle of the metal nanowire ink relative to the transparent resin film satisfies $10.0° < \theta a \leq 25.0°$, and a difference ($\theta a - \theta r$) between the advancing angle ($\theta a$) and a receding angle ($\theta r$) of the dynamic contact angle is 10.0° or more.

The transparent conductive film obtained by the production method according to the present aspect, a metal-nanowire-containing layer is layered on a transparent resin film which is a support substrate. A transparent resin film is used for the transparent support substrate. The thickness of the transparent resin film is not particularly limited, but, in order to apply a sufficient flexibility, the film thickness is preferably 1 mm or less, more preferably 500 μm or less, still more preferably 250 μm or less, and particularly preferably 125 μm or less. From the viewpoint of handling ability, the thickness of preferably 10 μm or more, more preferably 18 μm or more, still more preferably 25 μm or more, and particularly preferably 38 m or more.

Preferable examples of the transparent resin film which can be used for the support substrate include a transparent resin film of polyester (polyethylene terephthalate [PET], polyethylene naphthalate [PEN], etc.), polycarbonate, an acrylic resin such as polymethylmethacrylate [PMMA], etc., a cycloolefin polymer, and the like. Among these films, from the viewpoints of superior light transmittance, flexibility, and mechanical properties, using polyethylene terephthalate and the cycloolefin polymer are preferable. For the cycloolefin polymer, a hydrogenated ring-opening metathesis polymer-type cycloolefin polymer of norbornene and a norbornene/ethylene addition copolymer-type cycloolefin polymer can be used.

Further, in order to use the transparent conductive film obtained by the production method according to the present aspect as an input device such as a touch panel, using the transparent resin film having a total light transmittance of 70% or more, preferably 80% or more is desirable. When an emphasis is put on the transparency, and also in view of the flexibility and the handling ability as the support substrate, the transparent resin film has a thickness of preferably in the range of approximately 10 to 500 μm.

The metal nanowire contained in the metal nanowire ink used in the present aspect is a conductive material made of metal and having a wire shape with a diameter in the order of nanometer. In the present aspect, in addition to (by mixing with) or instead of the metal nanowire, metal nanotube which is a conductive material having a porous or nonporous tubular shape, may be used. In the present specification, both the "wire shape" and the "tubular shape" refer to a linear shape, but the former refers to a solid body, while the latter refers to a hollow body. Both may be soft or rigid. The former is referred to as "metal nanowire in a narrow sense", and the latter is referred to a "metal nanotube in a narrow sense" Hereinbelow, in the present specification, the term "metal nanowire" is used to include both the metal nanowire in a narrow sense and the metal nanotube in a narrow sense. Only the metal nanowire in a narrow sense, or only the metal nanotube in a narrow sense may be used, or they may be mixed for use.

The metal nanowires and the metal nanotubes have an average diameter of preferably 1 to 500 nm, more preferably 2 to 200 nm, still more preferably 5 to 100 nm, and particularly preferably 10 to 100 nm. The metal nanowires and the metal nanotubes have an average major axis length of preferably 1 to 100 μm, more preferably 1 to 50 μm, still more preferably 2 to 50 μm, and particularly preferably 5 to 30 μm. While satisfying the above average diameter and the average major axis length, the metal nanowires and the metal nanotube have an average aspect ratio of preferably more than 5, more preferably 10 or more, still more preferably 100 or more, and particularly preferably 200 or more. Here, the aspect ratio refers to a value obtained by a/b, wherein "b" represents an average diameter of the metal nanowire and the metal nanotube and "a" represents an average major axis length thereof. The values "a" and "b" may be measured by a scanning electron microscope (SEM).

The kind of the metal may be at least one selected from the group consisting of gold, silver, platinum, copper, nickel, iron, cobalt, zinc, ruthenium, rhodium, palladium, cadmium, osmium, and iridium, or may be an alloy etc., formed by combining some of these. In order to obtain a transparent conductive layer having a low surface resistance and a high total light transmittance, containing at least one of gold, silver, and copper is preferable. These metals have a high conductivity, and thus, when a certain surface resistance should be obtained, the density of the metal within the surface may be reduced, and high total light transmittance can be achieved.

Among these metals, containing at least gold or silver is preferable. The most appropriate example may be the silver nanowire.

As a method for producing the metal nanowire or the metal nanotube, a known method may be applied. For example, silver nanowires may be synthesized by reducing the silver nitrate under the presence of polyvinylpyrrolidone, using a polyol method (refer to Chem. Mater., 2002, 14, 4736). Similarly, gold nanowires may be synthesized by reducing the gold chloride acid hydrate under the presence of polyvinylpyrrolidone (refer to J. Am. Chem. Soc., 2007, 129, 1733). WO 2008/073143 pamphlet and WO 2008/046058 pamphlet have detailed description regarding the technology of large scale synthesis and purification of silver nanowires and gold nanowires. Gold nanotubes having a porous structure may be synthesized by using silver nanowires as templates, and reducing a gold chloride acid solution. The silver nanowires used as templates are dissolved in the solution by oxidation-reduction reaction with the gold chloride acid, and as a result, gold nanotubes having a porous structure can be produced (refer to J. Am. Chem. Soc., 2004, 126, 3892-3901).

The metal nanowire content in the metal nanowire ink is preferably 0.01 to 1.5 mass %. If the content is less than 0.01 mass %, the concentration of the conductive material is too low, the conductivity of the coated film obtained by coating (printing) is too low, and thus, measurement of the sheet resistance by a measurement method described in Examples below may be impossible. Whereas, if the content exceeds 1.5 mass %, the transparency may not be maintained. The content is preferably 0.1 to 1.0 mass %, more preferably 0.15 to 0.5 mass %, and still more preferably 0.2 to 0.4 mass %. In the present specification, the term "transparent" refers to the fact that the substrate on which the metal nanowire ink is printed has a total light transmittance of 70% or more, and a haze of 2% or less.

The binder resin used in the metal nanowire ink according to the present aspect may be poly-N-vinylacetamide (PNVA) which is a homopolymer of N-vinylacetamide (NVA), but a copolymer having more than 50 mol % of monomer units derived from N-vinylacetamide (NVA) may also be used. Examples of a monomer which can be copolymerized with N-vinylacetamide (NVA) include acrylic acid, methacrylic acid, sodium acrylate, sodium methacrylate, acrylamide, and the like. Such a polymer has a weight average molecular weight of preferably 30,000 to 1,500,000, and more preferably 80,000 to 900,000. Further, the binder resin content in the metal nanowire ink is preferably 0.1 to 2.0 mass %. If the content is less than 0.1 mass %, a uniformly coated film may not be obtained. Whereas, if the content exceeds 2.0 mass %, the coated film becomes thick and the metal nanowires are buried in the binder resin (the metal nanowires have no exposed portions), leading to decrease in conductivity (measurement of the sheet resistance becomes impossible). The content is preferably 0.15 to 1.0 mass %, more preferably 0.15 to 0.5 mass %, and still more preferably 0.15 to 0.30 mass %.

The solvent contained in the metal nanowire ink used in the present aspect is preferably a mixture solvent of alcohol and water because the metal nanowires can be dispersed well and the drying rate can be easily controlled. The content of alcohol in the mixture solvent is preferably 85 mass % or more and 95 mass % or less. For the alcohol, at least one type of saturated monohydric alcohol having 1 to 3 carbon atoms (methanol, ethanol, normal-propanol, and isopropanol), represented by $C_nH_{2n+1}OH$ (n represents an integer of 1 to 3) is contained. The content of the saturated monohydric alcohol having 1 to 3 carbon atoms, relative to the alcohol in total, is preferably 30 mass % or more and 85 mass % or less, and more preferably 30 mass % or more and 70 mass % or less. Using the saturated monohydric alcohol having 1 to 3 carbon atoms is advantageous in the process because the drying becomes easy.

As alcohol, an alcohol other than the saturated monohydric alcohol having 1 to 3 carbon atoms can be used together. The other alcohol which can be used together, may be ethylene glycol, propylene glycol, ethylene glycol monomethyl ether, ethylene glycol monoethyl ether, propylene glycol monomethyl ether, propylene glycol monoethyl ether, and the like. The content of the alcohol other than the saturated monohydric alcohol having 1 to 3 carbon atoms is preferably 15 mass % or more and 70 mass % or less, and more preferably 30 mass % or more and 70 mass % or less, relative to the alcohol in total. If any of these alcohols is used together with the saturated monohydric alcohol having 1 to 3 carbon atoms, the drying rate may be adjusted.

Further, the water content in the mixture solvent is preferably 5 mass % or more and 15 mass % or less, and more preferably 5 mass % or more and 10 mass % or less. If the water content is less than 5 mass % repelling may occur at the time of coating, and the coating may not be done. Accordingly, the preferable content ratio (mass ratio) among the saturated monohydric alcohol having 1 to 3 carbon atoms (S1), the alcohol other than the saturated monohydric alcohol having 1 to 3 carbon atoms (S2), and water (S3) is preferably (S1):(S2):(S3) being 25 to 80:70 to 15:5 to 15, and more preferably (S1):(S2):(S3) being 30 to 65:65 to 30:5 to 15 (with the proviso that (S1)+(S2)+(S3)=100).

The metal nanowire ink used in the present aspect may contain an additive such as a surfactant, antioxidant, filler, and the like, as far as there is no bad influence on performance such as printability, conductivity, optical property, etc. In order to adjust the viscosity of the composition, fillers such as fumed silica, etc., may be used. The total amount of such additives to be mixed in the metal nanowire ink is preferably 5 mass % or less.

The metal nanowire ink according to the present aspect may be produced by blending the above-mentioned metal nanowire, binder resin, solvent, and additives which can be added in accordance with needs, in the above blending ratio (mass %) (the remaining parts being the mixture solvent of alcohol and water), and stirring and mixing the blended product by a planetary centrifugal mixer, etc. Thereby, metal nanowire ink having a viscosity of appropriately 1 to 50 mPa·s (25° C.) can be obtained.

Figure 2A:
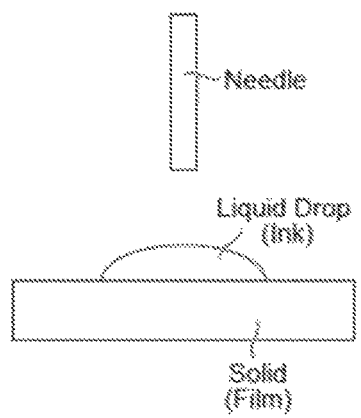
FIGS. 2A to 2C depict an extension/contraction measurement method of the advancing angle and the receding angle.
Figure 2B:
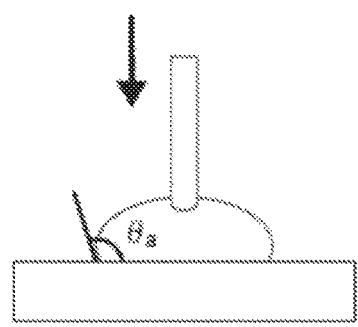
Figure 2C:
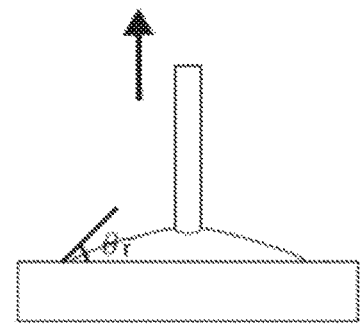

The method for producing the transparent conductive film according to the present aspect comprises a step of coating the metal nanowire ink on at least one face of the transparent resin film by a slit coating method or a roll coating method, and drying the same. In order to form a transparent conductive layer having a superior in-plane uniformity of resistance, the metal nanowire ink should have a superior wettability to the transparent resin film, In order to improve the wettability between an ink and a film, in general, a method for reducing the contact angle between the ink and the film is used. However, when the ink is coated on the film, liquid drops are moving. Thus, the evaluation using a static contact angle is not sufficient, and the evaluation using a dynamic contact angle is preferable. A dynamic contact angle can be measured by contact angles (advancing angle (θa) and receding angle (θr)) when an interface of an ink advances or recedes as the ink in contact with a film expands or shrinks. In case that both of the advancing angle (θa) and the receding angle (θr) are low, the wettability is high. Also, when the difference (θa−θr) between the advancing angle (θa) and the receding angle (θr) is large, adhesion between the ink and the film is strong, leading to a superior coating property. A static contact angle is shown in FIG. 2A, an advancing contact angle (θa) is shown in FIG. 2B (the contact angle when the contact area started to expand), and a receding contact angle (θr) is shown in FIG. 2C (the contact angle when the contact area started to contract).

The result of the studies by the inventors of the present disclosure reveals that when a metal nanowire ink containing a binder resin having more than 50 mol % of monomer units derived from N-vinylacetamide, and a solvent is used, and if the dynamic contact angle of the metal nanowire ink to the transparent resin film satisfies that the advancing angle (θa) is 10.0°<θa≤25.0° and the difference (θa−θr) between the advancing angle (θa) and the receding angle (θr) is 10.0° or more, and preferably 20.0° or less, and the metal nanowire ink was coated on the transparent resin film by a slit coating method or a roll coating method, a transparent conductive film having a superior in-plane uniformity of resistance can be produced. The slit coating method includes a bar coating, a slit (die) coating, and a comma coating. The roll coating method includes gravure printing, and flexo printing.

In the method producing the transparent conductive film according to the present aspect, after the metal nanowire ink is coated on at least one face of the transparent resin film, and dried, the resultant may be subjected to sintering in accordance with needs. The sintering may be performed by oven heating, pulsed light irradiation, microwave irradiation, etc., but the sintering method is not limited to these.

In order to protect the transparent conductive layer of the transparent conductive film, an overcoat layer may be formed. A known overcoat layer may be used, but preferably, a composition for a protective film comprising (A) a polyurethane containing a carboxyl group, (B) an epoxy compound, (C) a curing accelerator, and (D) a solvent, wherein the content of the solvent (D) is 95.0% by mass or more and 99.9% by mass or less, (D) comprises (D1) and (D2), (D1) being a solvent having a boiling point exceeding 100° C. and containing a hydroxyl group, (D2) being a solvent having a boiling point of 100° C. or lower, and the content of (D2) solvent having the boiling point of 100° C. or lower is 30% by mass or more and 85% by mass or less, and more preferably 30 mass % or more 80 mass % or less of the solvent in total, is used.

By the above method for producing a transparent conductive film, a transparent conductive film having a total light transmittance of 70% or more, preferably 80% or more, and still more preferably 90% or more, and having a haze value of 0.1 to 2.0%, preferably 0.3 to 1.7%, and still more preferably 0.5 to 1.5% can be obtained.

The sheet resistance of the above transparent conductive film may be appropriately selected depending on the use thereof. For example, when the film is used as a transparent conductor of a transparent electrode for a touch panel, etc., the sheet resistance is preferably 1 to 200Ω/□.

These values are measured by the method described in Examples below.

The second aspect of the present disclosure is a method for producing a transparent conductive pattern comprising a step of patterning the transparent conductive layer of the transparent conductive film produced according to the first aspect. For the method for patterning the transparent conductive layer of the transparent conductive film, known methods such as photolithography, laser etching may be applied to obtain a predetermined pattern. Patterning may be performed to the transparent conductive layer with an overcoat layer.

Patterning is performed to a transparent conductive layer before an overcoat layer is formed, and the overcoat layer is formed to cover the obtained transparent conductive pattern in the same way as the first aspect.

EXAMPLES

Hereinbelow, specific examples of the present disclosure will be specifically explained. The examples are described below for the purpose of easy understanding of the present disclosure, and the present disclosure is not limited to these examples.

<Observing Shape of Silver Nanowire>

The shape (length, diameter) of the silver nanowire was obtained by observing diameters and lengths of arbitrarily selected 50 nanowires using the ultra-high resolution field emission scanning electron microscope SU8020, manufactured by Hitachi High-Technologies Corporation (accelerating voltage: 3 to 10 kV), and obtaining the arithmetic average values.

Using the UV-visible/NIR spectrophotometer V-670 manufactured by JASCO Corporation, UV-visible absorption spectra at 300 to 600 nm was measured, and the ratio (Abs($\lambda$450)/Abs($\lambda$max)) was obtained, Abs($\lambda$max) being the maximum peak value of light absorbance at 370 nm to 380 nm based on silver nanowires, and Abs($\lambda$450) being a light absorbance value at the wavelength of 450 nm representing spherical particles of silver. Although depending on the shape of the silver nanowires, the preferable of the ratio is 0.1 to 0.5. The smaller the ratio, the smaller the amount of spherical particles generated at the time of synthesizing the silver nanowires. If no spherical particles are present, the ratio is approximately 0.1.

<Synthesis of Silver Nanowire>

100 g of propylene glycol (manufactured by Wako Pure Chemical Industries, Ltd.) was weighed in a 200 mL glass container, and 2.3 g (13 mmol) of silver nitrate (manufactured by Toyo Chemical Industrial Co., Ltd.) was added thereto as a metal salt, which was stirred for 2 hours at a room temperature, to thereby prepare a silver nitrate solution (second solution).

600 g of propylene glycol, 0.052 g (0.32 mmol) of tetraethylammonium chloride (manufactured by Lion Specialty Chemicals Co., Ltd.) as an ionic derivative, 0.008 g (0.08 mmol) of sodium bromide (manufactured by Manac Incorporated), and 7.2 g of polyvinylpyrrolidone K-90 (PVP) (weight average molecular weight: 350,000, manufactured by Wako Pure Chemical Industries, Ltd.) as a structure control agent were provided in a 1 L four-neck flask (mechanical stirrer, dropping funnel, reflux tube, thermometer, nitrogen gas introducing tube), under a nitrogen gas atmosphere. The resultant was stirred at the rotation number of 200 rpm, at 150° C. for one hour until complete dissolution, to thereby obtain a first solution. The previously prepared silver nitrate solution (second solution) was provided in the dropping funnel, and while the temperature of the first solution was maintained at 150° C., dropping was performed for 2.5 hours (average supply rate of the silver nitrate being 0.087 mmol/min), to thereby synthesize silver nanowires. In this case, the molar ratio (average supply molar number of silver nitrate/ionic derivative) was 0.22, the ratio being calculated from the molar number of total halogen atoms of the ionic derivative in the first solution (0.40 mmol) and the average supply rate of the silver nitrate (0.087 mmol/min). Further, the silver ion concentration of the first solution was measured during the reaction. The molar ratio (metal salt/ionic derivative) between the molar number of total halogen atoms of the ionic derivative in the first solution during the reaction, and the metal salt was in the range of 0.2 to 6.7. After the dropping was complete, heating and stirring were further continued for one hour, and reaction was finished. The metal salt (silver ion) concentration in the first solution was measured by the automatic titration apparatus AUT-301 manufactured by DKK-TOA Corporation, by potentiometric titration using an oxidation-reduction potentiometer with silver electrodes.

The reaction mixture was diluted by 5 times (by mass) with methanol, to which the centrifugal force was applied at the rotation number of 6000 rpm for 5 minutes, using a centrifugal separator, to thereby deposit silver nanowires. After the supernatant liquid was removed, methanol was added, to which an operation to process the same at 6000 rpm for 5 minutes was repeated twice, to wash the PVP and the solvent remaining in the system.

The diameters and the lengths of the obtained silver nanowires were obtained from the images obtained by the above method using the field emission scanning electron microscope SU8020 (FE-SEM). The average diameter was 36.3 nm, and the average length was 25.5 μm.

Further, based on the UV-visible absorption spectra of the obtained silver nanowires, Abs(λ450)/Abs(λmax) was 0.21.

<Support Substrate (Film)>

The following four types of support substrates (films) were used in Examples and Comparative Examples.

COP film (ZEONOR (registered trademark): hydrogenated ring-opening metathesis polymer type cycloolefin polymer ZF14 (thickness 100 μm), manufactured by Zeon Corporation))

COC film (norbornene addition copolymer type cycloolefin polymer CN-P (thickness 50 μm), manufactured by Showa Denko K.K.)

PET film (OPTERIA (registered trademark) H522-50 (thickness 50 μm), manufactured by Lintec Corporation)
PET film (COSMOSHINE (registered trademark) A4100 (thickness 100 μm), manufactured by Toyobo Co., Ltd.)

<Ink Preparation>

Ink 1

As a source for the binder resin, poly-N-vinylacetamide (PNVA) (GE191-103, homopolymer (weight average molecular weight 900,000 (catalog value), manufactured by Showa Denko K.K.), 10 mass % aqueous solution) was used.

The silver nanowire dispersion liquid (solvent being methanol) obtained as above, 10 mass % aqueous solution of the above PNVA, water ($H_2O$), methanol (MeOH), ethanol (EtOH), propylene glycol monomethyl ether (PGME), and propylene glycol (PG) were provided in a container with a lid, the lid was closed, and the resultant was mixed by a planetary centrifugal mixer. The ink 1 was obtained by adjusting the mixing amounts so that the mixed composition was water ($H_2O$):methanol (MeOH):ethanol (EtOH):propylene glycol monomethyl ether (PGME):propylene glycol (PG) [mass ratio]=10:10:40:34:6, and relative to the total amount of the mixture, the amount of PNVA component supplied from the PNVA aqueous solution was 0.18 mass %, and the amount of metal silver supplied by the silver nanowires was 0.23 mass % (the remaining 99.59 parts by mass being the dispersion medium of the above composition).

Ink 2

Ink 2 was obtained under the same conditions as Ink 1, except that polyvinylpyrrolidone (PVP) (Sokalan (registered trademark) K-120, manufactured by BASF) was used instead of PNVA, as a binder resin (Table 1).

Ink 3

Ink 3 was obtained under the same conditions as Ink 1, except that polyvinyl alcohol (PVA) (Kuraray Poval PVP-505, manufactured by Kuraray Co., Ltd.) was used instead of PNVA, as a binder resin (Table 1).

Ink 4

Ink 4 was obtained under the same conditions as Ink 1, except that a cellulose based polymer (hydroxypropyl cellulose (HPC), manufactured by Wako Pure Chemical Industries, Ltd.) was used instead of PNVA, as a binder resin (Table 1).

Ink 5

Ink 5 was obtained under the same conditions as Ink 1, except that a cellulose based polymer (ethyl cellulose (ETHOCEL) (registered trademark) Industrial STD 100 CPS, manufactured by Nisshin Kasei Co., Ltd.) was used instead of PNVA, as a binder resin (Table 1).

Ink 6

Ink 6 was prepared under the same conditions as Ink 1, except that a cellulose based polymer (methyl cellulose (METHOCEL), manufactured by Wako Pure Chemical Industries, Ltd.) was used instead of PNVA, as a binder resin. However, the binder resin was not dissolved in the solvent (Table 1).

Ink 7

Ink 7 was obtained in the same way as Ink 1, except that the mixing amounts of solvent were adjusted so that the mixed composition was water ($H_2O$):methanol (MeOH):isopropanol (IPA):propylene glycol monomethyl ether (PGME) [mass ratio]=10:10:40:40, and relative to the total amount of the mixture, the amount of metal silver supplied by the silver nanowires was 0.25 mass % (the remaining 99.57 parts by mass being the dispersion medium of the above composition).

Ink 8

Ink 8 was obtained in the same way as Ink 1, except that the mixing amounts of solvent were adjusted so that the mixed composition was water ($H_2O$):methanol (MeOH):ethanol (EtOH):propylene glycol monomethyl ether (PGME) [mass ratio]=10:35:35:20, and relative to the total amount of the mixture, the amount of metal silver supplied by the silver nanowires was 0.25 mass % (the remaining 99.57 parts by mass being the dispersion medium of the above composition).

Ink 9

Ink 9 was obtained in the same way as Ink 1, except that the mixing amounts of solvent were adjusted so that the mixed composition was water ($H_2O$):methanol (MeOH):ethanol (EtOH):propylene glycol monomethyl ether (PGME) [mass ratio]=10:10:60:20, and relative to the total amount of the mixture, the amount of metal silver supplied by the silver nanowires was 0.25 mass % (the remaining 99.57 parts by mass being the dispersion medium of the above composition).

Ink 10

Ink 10 was obtained in the same way as Ink 1, except that the mixing amounts of solvent were adjusted so that the mixed composition was water ($H_2O$):methanol (MeOH):isopropanol (IPA):propylene glycol monomethyl ether (PGME) [mass ratio]=10:10:60:20, and relative to the total amount of the mixture, the amount of metal silver supplied by the silver nanowires was 0.25 mass % (the remaining 99.57 parts by mass being the dispersion medium of the above composition).

Ink 11

Ink 11 was obtained in the same way as Ink 1, except that the mixing amounts of solvent were adjusted so that the mixed composition was water ($H_2O$):methanol (MeOH):ethanol (EtOH):propylene glycol monomethyl ether (PGME) [mass ratio]=15:35:35:15, and relative to the total amount of the mixture, the amount of metal silver supplied by the silver nanowires was 0.25 mass % (the remaining 99.57 parts by mass being the dispersion medium of the above composition).

<Silver Content>

Sample liquid in which silver nanowires were dispersed was collected from the obtained silver nanowire ink (Ink 1), and a nitric acid was added to the liquid to dissolve the silver nanowire. The amount of silver was measured by the atomic absorption spectrophotometer (apparatus:furnace atomic absorption spectrophotometer AA280Z, manufactured by Agilent Technologies Japan, Ltd.) As a result, the silver content was 0.233 mass %, which was similar to 0.23 mass %, i.e., the targeted value in the ink preparation. Accordingly, in Table 1, the silver content was indicated by the nominal value (targeted value) (the same is true in each example below.)

Table 1 shows the composition, the solubility to the solvent, and the viscosity obtained by the digital viscometer DV-E (spindle: SC4-18) manufactured by Brookfield, at 25° C., for each of Ink 1 to Ink 11.

<Production of Transparent Conductive Film>

Using a coater 70F0 manufactured by Imoto Machinery Co., Ltd., each silver nanowire ink was coated with a bar coater to have a wet film thickness of approximately 15 μm, at a printing speed of 100 mm/sec, on a support substrate (film substrate) having a size of 21 cm×30 cm. Thereafter, using a hot-air dryer (ETAC HS350, manufactured by Kusumoto Chemicals, Ltd.), the ink was dried. For Ink 1 to Ink 5, drying was performed at 100° C. for 10 minutes. For Ink 7 to Ink 11, drying was performed at 80° C. for 5 minutes. Thereby, transparent conductive films each having a transparent conductive layer, were formed.

<Sheet Resistance/Optical Property>

Sheet resistance of the obtained transparent conductive film was measured by Loresta GP, manufactured by Mitsubishi Chemical Analytech Co., Ltd.) As optical properties of the transparent conductive film, a total light transmittance and a haze were measured by the haze meter NDH 2000, manufactured by Nippon Denshoku Industries Co., Ltd. For the reference of the optical property measurement, measurement using air was performed. The results are shown in Table 1.

<Measurement of In-Plane Uniformity of Sheet Resistance>

As shown in FIG. 1, 70 squares, each having a size of 3 cm×3 cm, are arranged in a rectangular array of 7 rows and 10 columns on a A4-size sheet sample (transparent conductive film) to be measured, and surface resistance values at 12 squares indicated by hatched lines were measured, respectively. Among the surface resistance values, the maximum value was represented by Rmax, and the minimum value was represented by Rmin, and the in-plane uniformity was calculated on the basis of the formula (1).

$$\text{in-plane uniformity } [\%] = [(R\max - R\min)/(R\max + R\min)] \times 100 \quad (1)$$

<Plasma Treatment of Support Substrate (Film Substrate)>

The plasma treatment was performed as surface treatment of the film substrate, using a plasma treatment apparatus (AP-T03, manufactured by Sekisui Co., Ltd.) with the power output of 1 kW for 20 seconds, under a nitrogen gas atmosphere.

<Contact Angle>

Contact angles were measured by Drop Master DM500, manufactured by Kyowa Interface Science, Inc. Because the liquid surface is moving at the time of coating, dynamic contact angles i.e., an advancing angle (θa) and a receding angle (θr) relative to the COP film substrate, were measured by the extension/contraction method. Using the above-mentioned silver nanowire ink, with the liquid volume of 3 μL, measurement was performed at five different parts. The averages of the measurement results are shown in Table 2.

Example 1

A transparent conductive film was produced, using a COP film (with plasma treatment) as the support substrate (film substrate), and using Ink 1 as the ink. The result of evaluation is shown in Table 2.

The result was superior, with the sheet resistance of 39.4Ω/□, and the in-plane uniformity of 20% or less (9.1%). As optical properties, the total light transmittance was 90%, and the haze was 1.31%.

Example 2

A transparent conductive film was produced, using a COC film (with plasma treatment) as the support substrate (film substrate), and using Ink 1 as the ink. The result of evaluation is shown in Table 2.

Example 3

A transparent conductive film was produced, using a PET film (OPTERIA (registered trademark) H522-50, manufactured by Lintec Corporation) (without plasma treatment) provided with a hard coat layer, as the support substrate (film substrate), and using Ink 1 as the ink. The result of evaluation is shown in Table 2.

Example 4

A transparent conductive film was produced, using a PET film (OPTERIA (registered trademark) H522-50, manufactured by Lintec Corporation) provided with a hard coat layer (with plasma treatment to the hard coat layer), as the support substrate (film substrate), and using Ink 1 as the ink. The result of evaluation is shown in Table 2.

Example 5

A transparent conductive film was produced, using a PET film (COSMOSHINE (registered trademark) A4100, manufactured by Toyobo Co., Ltd.) provided with an easily adhesive layer (without plasma treatment), as the support substrate (film substrate), and using Ink 1 as the ink. The result of evaluation is shown in Table 2.

Example 6

A transparent conductive film was produced, using a COP film (with plasma treatment) as the support substrate (film substrate), and using Ink 7 as the ink. The result of evaluation is shown in Table 2.

Example 7

A transparent conductive film was produced, using a PET film (OPTERIA (registered trademark) H522-50, manufactured by Lintec Corporation) provided with a hard coat layer, as the support substrate (film substrate), and using Ink 7 as the ink. The result of evaluation is shown in Table 2.

Example 8

A transparent conductive film was produced, using a PET film (COSMOSHINE (registered trademark) A4100, manufactured by Toyobo Co., Ltd.) provided with an easily adhesive layer (without plasma treatment), as the support substrate (film substrate), and using Ink 7 as the ink. The result of evaluation is shown in Table 2.

Example 9

A transparent conductive film was produced, using a PET film (OPTERIA (registered trademark) H522-50, manufactured by Lintec Corporation) provided with a hard coat layer, as the support substrate (film substrate), and using Ink 8 as the ink. The result of evaluation is shown in Table 2.

Example 10

A transparent conductive film was produced, using a PET film (OPTERIA (registered trademark) H522-50, manufactured by Lintec Corporation) provided with a hard coat layer, as the support substrate (film substrate), and using Ink 9 as the ink. The result of evaluation is shown in Table 2.

Example 11

A transparent conductive film was produced, using a PET film (OPTERIA (registered trademark) H522-50, manufactured by Lintec Corporation) provided with a hard coat layer, as the support substrate (film substrate), and using Ink 10 as the ink. The result of evaluation is shown in Table 2.

Example 12

A transparent conductive film was produced, using a PET film (OPTERIA (registered trademark) H522-50, manufactured by Lintec Corporation) provided with a hard coat layer, as the support substrate (film substrate), and using Ink 11 as the ink. The result of evaluation is shown in Table 2.

In all of the Examples, the results were superior, with the sheet resistance of less than 60Ω/□, and the in-plane uniformity of 20% or less. As optical properties, the total light transmittance was as high as approximately 90%, and the haze was less than 2%.

Comparative Example 1

A transparent conductive film was produced, using a COP film (without plasma treatment) as the support substrate (film substrate), and using Ink 1 as the ink. Comparative Example 1 is different from Example 1 in the point that whether or not the plasma treatment was performed to the COP film used as the support substrate (film substrate). Because the COP film was not plasma-treated, the advancing angle (θa) was larger than 25.00, and a uniform coating film could not be obtained, unlike Example 1.

Comparative Example 2

A transparent conductive film was produced, using a COP film (with plasma treatment) as the support substrate (film substrate), and using Ink 2 as the ink. Comparative Example 2 is different from Example 1 in the point that polyvinylpyrrolidone (PVP) (Sokalan (registered trademark) K-120, manufactured by BASF) was used instead of PNVA used in Example 1, as a binder resin for the ink. The result of evaluation is shown in Table 2. The difference (θa−θr) between the advancing angle (θa) and the receding angle (θr) was less than 10.0°, and the in-plane uniformity of the sheet resistance was inferior to that of Example 1.

Comparative Example 3

A transparent conductive film was produced, using a COP film (with plasma treatment) as the support substrate (film substrate), and using Ink 3 as the ink. Comparative Example 3 is different from Example 1 in the point that polyvinyl alcohol (PVA) (Kuraray Poval PVP-505, manufactured by Kuraray Co., Ltd.) was used instead of PNVA used in Example 1, as a binder resin for the ink. The result of evaluation is shown in Table 2. Although the advancing angle (θa), and the difference (θa−θr) between the advancing angle (θa) and the receding angle (θr) are not particularly different from those of Example 1, the in-plane uniformity of the sheet resistance was inferior to that of Example 1. The reason therefor is not clear, but because the kinds of the binder resin were different, the dispersion property of the silver nanowires in the ink could have been inferior to that of Example 1.

Comparative Example 4

A transparent conductive film was produced, using a COP film (with plasma treatment) as the support substrate (film substrate), and using Ink 4 as the ink. Comparative Example 4 is different from Example 1 in the point that a cellulose based polymer (hydroxypropyl cellulose (HPC), manufactured by Wako Pure Chemical Industries, Ltd.) was used instead of PNVA, as a binder resin in Example 1, as a binder resin for the ink. The result of evaluation is shown in Table 2. The difference (θa−θr) between the advancing angle (θa) and the receding angle (θr) was less than 10.0°, the sheet resistance is approximately ten times higher than that of Example 1, and the in-plane uniformity was inferior to that of Example 1.

Comparative Example 5

A transparent conductive film was produced, using a COP film (with plasma treatment) as the support substrate (film substrate), and using Ink 5 as the ink. Comparative Example 5 is different from Example 1 in the point that a cellulose based polymer (ethyl cellulose (ETHOCEL) (registered trademark) Industrial STD 100 CPS, manufactured by Nisshin Kasei Co., Ltd.) was used instead of PNVA, as a binder resin in Example 1, as a binder resin for the ink. The result of evaluation is shown in Table 2. The difference (θa−θr) between the advancing angle (θa) and the receding angle (θr) was less than 10.0°, and the haze was 3 time or more higher than that of Example 1, i.e., inferior to that of Example 1.

TABLE 1

| | Silver Nanowire Ink | | | | | | | | | | | | | | Viscosity [mPa·s @ 25° C.] |
|---|---|---|---|---|---|---|---|---|---|---|---|---|---|---|---|
| | Conductor | Dispersion Medium | | | | | | Binder Resin [mass %] | | | | | | | |
| | Silver [mass %] | [mass %] | Mixing Ratio [mass ratio] | | | | | | | | | | | Solubility | |
| | | | H$_2$O | MeOH | EtOH | IPA | PGME | PG | PNVA | PVP | PVA | HPC | ETHO-CEL | METHO-CEL | | |
| Ink 1 | 0.23 | 99.59 | 10 | 10 | 40 | — | 34 | 6 | 0.18 | | | | | | Good | 5.2 |
| Ink 2 | 0.23 | 99.59 | 10 | 10 | 40 | — | 34 | 6 | | 0.18 | | | | | Good | 3.5 |

TABLE 1-continued

| | Silver Nanowire Ink | | | | | | | | | | | | | | Visco- |
| | Con-ductor | Dispersion Medium | | | | | | Binder Resin [mass %] | | | | | | | sity [mPa·s @ 25° C.] |
| | Silver [mass %] | [mass %] | Mixing Ratio [mass ratio] | | | | | | | | | | ETHO-CEL | METHO-CEL | Solu-bility | |
| | | | H$_2$O | MeOH | EtOH | IPA | PGME | PG | PNVA | PVP | PVA | HPC | | | | |
|---|---|---|---|---|---|---|---|---|---|---|---|---|---|---|---|---|
| Ink 3 | 0.23 | 99.59 | 10 | 10 | 40 | — | 34 | 6 | | | 0.18 | | | | Good | 3.6 |
| Ink 4 | 0.23 | 99.59 | 10 | 10 | 40 | — | 34 | 6 | | | | 0.18 | | | Good | 10.2 |
| Ink 5 | 0.23 | 99.59 | 10 | 10 | 40 | — | 34 | 6 | | | | | 0.18 | | Good | 4.3 |
| Ink 6 | 0.23 | 99.59 | 10 | 10 | 40 | — | 34 | 6 | | | | | | 0.18 | Binder resin insoluble | |
| Ink 7 | 0.25 | 99.57 | 10 | 10 | — | 40 | 40 | — | 0.18 | | | | | | Good | 4.8 |
| Ink 8 | 0.25 | 99.57 | 10 | 35 | 35 | — | 20 | — | 0.18 | | | | | | Good | 5.2 |
| Ink 9 | 0.25 | 99.57 | 10 | 10 | 60 | — | 20 | — | 0.18 | | | | | | Good | 4.9 |
| Ink 10 | 0.25 | 99.57 | 10 | 10 | — | 60 | 20 | — | 0.18 | | | | | | Good | 4.5 |
| Ink 11 | 0.25 | 99.57 | 15 | 35 | 35 | — | 15 | — | 0.18 | | | | | | Good | 5.1 |

TABLE 2

| | Film Substrate | | | | Wettability (Dynamic Contact Angle) | | | Resistance Properties | | Optical Properties | |
| | Material | Model No. | Surface Treatment | Liquid Drop | Advancing Angle θa [°] | Receding Angle θr [°] | Difference θa - θr [°] | Sheet Resistance [Ω/□] | In-Plane Uniformity [%-] | Total Light Transmittance [%-] | Haze [%] |
|---|---|---|---|---|---|---|---|---|---|---|---|
| Example 1 | COP | ZF14 | Plasma Treatment | Ink 1 | 14.5 | 3.1 | 11.4 | 39.4 | 9.1 | 90 | 1.31 |
| Example 2 | COC | CN-P | Plasma Treatment | Ink 1 | 20.0 | 2.4 | 17.6 | 46.3 | 13.4 | 90 | 1.71 |
| Example 3 | PET | H522-50 | Hard Coat Treatment | Ink 1 | 14.8 | 2.5 | 12.3 | 37.9 | 12.5 | 90 | 1.47 |
| Example 4 | PET | H522-50 | Hard Coat Treatment →Plasma Treatment | Ink 1 | 11.5 | 1.2 | 10.3 | 46.2 | 10.8 | 90 | 1.38 |
| Example 5 | PET | A4100 | No Plasma Treatment | Ink 1 | 13.9 | 3.3 | 10.6 | 56.1 | 19.4 | 89 | 1.85 |
| Example 6 | COP | ZF14 | Plasma Treatment | Ink 7 | 11.5 | 1.4 | 10.1 | 48.7 | 11.1 | 90 | 0.79 |
| Example 7 | PET | H522-50 | Hard Coat Treatment | Ink 7 | 13.8 | 1.5 | 12.3 | 46.2 | 13.0 | 90 | 0.88 |
| Example 8 | PET | A4100 | No Plasma Treatment | Ink 7 | 12.1 | 0.9 | 11.2 | 43.6 | 15.1 | 88 | 1.36 |
| Example 9 | PET | H522-50 | Hard Coat Treatment | Ink 8 | 15.7 | 1.8 | 13.9 | 49.9 | 12.2 | 90 | 0.84 |
| Example 10 | PET | H522-50 | Hard Coat Treatment | Ink 9 | 14.1 | 1.4 | 12.7 | 50.7 | 14.3 | 90 | 0.83 |
| Example 11 | PET | H522-50 | Hard Coat Treatment | Ink 10 | 13.7 | 1.0 | 12.7 | 50.9 | 10.5 | 90 | 0.86 |
| Example 12 | PET | H522-50 | Hard Coat Treatment | Ink 11 | 16.8 | 1.4 | 15.4 | 54.2 | 16.3 | 90 | 0.82 |
| Comparative Example 1 | COP | ZF14 | None | Ink 1 | 28.1 | 3.4 | 24.7 | Uniform Coating Impossible | | | |
| Comparative Example 2 | COP | ZF14 | Plasma Treatment | Ink 2 | 5.4 | 1.9 | 3.5 | 75.5 | 25.8 | 90 | 1.23 |
| Comparative Example 3 | COP | ZF14 | Plasma Treatment | Ink 3 | 16.4 | 0.8 | 15.6 | 134.1 | 45.1 | 90 | 1.32 |
| Comparative Example 4 | COP | ZF14 | Plasma Treatment | Ink 4 | 10.7 | 1.6 | 9.1 | 369.9 | 67.3 | 89 | 1.45 |
| Comparative Example 5 | COP | ZF14 | Plasma Treatment | Ink 5 | 5.8 | 1.0 | 4.8 | 41.0 | 20.8 | 90 | 4.46 |

As is apparent from the results shown in Table 2, when PNVA was used for the binder resin, and the advancing angle (θa) of the dynamic contact angle between the film and the metal nanowire ink was 25.0° or less, no repelling was observed, and printing was possible. Further, when the difference (θa−θr) between the advancing angle (θa) and the receding angle (θr) was 10.0° or more, the in-plane uniformity of resistance was 20% or less. Further, with respect to the optical properties, the transparency was high, and the haze was low.

On the other hand, when the advancing angle (θa) of the dynamic contact angle between the film and the metal nanowire ink exceeds 25.00, the ink was repelled, and the coating could not be done (Comparative Example 1). Further, when binder resins different from the binder resins used in Examples were used, even if the difference (θa−θr) between the advancing angle (θa) and the receding angle (θr) was 10.0° or more, the in-plane uniformity of resistance could be inferior (Comparative Example 3). Thus, the use in a device such as a touch panel is substantially impossible.

The invention claimed is:

1. A method for producing a transparent conductive film comprising:
    a step of forming a transparent conductive layer by coating a metal nanowire ink on at least one face of a transparent resin film, and drying the coated ink,
    the metal nanowire ink comprising metal nanowires, a binder resin having more than 50 mol % of monomer units derived from N-vinylacetamide, and a solvent, and
    the solvent is a mixture solvent of alcohol and water, a content of the alcohol in the mixture solvent is 85 mass % or more and 95 mass % or less, and a content of saturated monohydric alcohol having 1 to 3 carbon atoms represented by $C_nH_{2n+1}OH$ (n represents an integer of 1 to 3) in the alcohol is 30 mass % or more and 85 mass % or less,
    wherein, the coating of the metal nanowire ink on the transparent resin film is performed by a slit coating method or a roll coating method, using the transparent resin film and the metal nanowire ink with which an advancing angle (θa) of a dynamic contact angle of the metal nanowire ink relative to the transparent resin film satisfies $10.0°<θa≤25.0°$, and a difference (θa−θr) between the advancing angle (θa) and a receding angle (θr) of the dynamic contact angle is 10.0° or more.

2. A method for producing a transparent conductive film according to claim 1, wherein the metal nanowires are silver nanowires.

3. A method for producing a transparent conductive film according to claim 1, wherein a content of the metal nanowire in the metal nanowire ink is 0.01 to 1.5 mass %.

4. A method for producing a transparent conductive film according to claim 1, wherein the transparent resin film is a film made of a resin selected from a group consisting of polyester, polycarbonate, an acrylic resin, and a cycloolefin polymer.

5. A method for producing a transparent conductive film according to claim 1, wherein a content of the binder resin in the metal nanowire ink is 0.1 to 2.0 mass %.

6. A method for producing a transparent conductive film according to claim 1, further comprising a step of forming an overcoat layer which covers the transparent conductive layer.

7. A method for producing a transparent conductive pattern comprising a step of patterning a transparent conductive layer of the transparent conductive film obtained by the method for producing the transparent conductive film according to claim 1.

8. A method for producing a transparent conductive pattern according to claim 7, further comprising a step of forming an overcoat layer which covers the transparent conductive pattern.

* * * * *